United States Patent [19]

Staifer

[11] 3,814,366

[45] June 4, 1974

[54] APPLIANCE STORAGE APPARATUS

[76] Inventor: Earl Franklin Staifer, 1732 Glenn Ellyn Dr., Toledo, Ohio 43614

[22] Filed: June 8, 1972

[21] Appl. No.: 260,837

[52] U.S. Cl.............................. 248/286, 312/323
[51] Int. Cl............................................ A47b 88/00
[58] Field of Search............. 248/286, 240.1, 240.4; 312/322, 323, 249, 250

[56] References Cited
UNITED STATES PATENTS

| | | | |
|---|---|---|---|
| 369,243 | 8/1887 | Hodges et al. | 312/323 UX |
| 2,254,832 | 9/1941 | Weight | 312/323 X |
| 2,704,237 | 3/1955 | Nave | 312/323 |
| 2,749,201 | 6/1956 | Koury et al. | 312/323 |
| 2,839,349 | 6/1958 | Culver | 312/323 |

FOREIGN PATENTS OR APPLICATIONS

| | | | |
|---|---|---|---|
| 862,275 | 3/1961 | Great Britain | 312/323 |
| 423,887 | 2/1935 | Great Britain | 312/323 |

Primary Examiner—J. Franklin Foss
Attorney, Agent, or Firm—Allen Owen; Richard D. Emch

[57] ABSTRACT

An appliance storage apparatus is disclosed. The apparatus comprises a frame which supports two opposing side walls. Arched track members are mounted in parallel relationship on the interior opposing side walls. A round projection, connected to the appliance to be stored, has its opposite ends in registry with the opposing arched tracks. The round projection is movable from an open front position of an enclosure, defined by the side walls, to a rear position in the enclosure along the opposing track members. The appliance is movable pivotally about the round projection from a horizontal position within the enclosure to a vertical, operating position when the round projection is at a front position on the arched tracks. The appliance is stored within the enclosure by pivoting it to a horizontal position on the round projection and sliding the round projection to the rear position on the tracks. A support member on the appliance retains the appliance in a horizontal position when within the enclosure.

4 Claims, 4 Drawing Figures

PATENTED JUN 4 1974 3,814,366
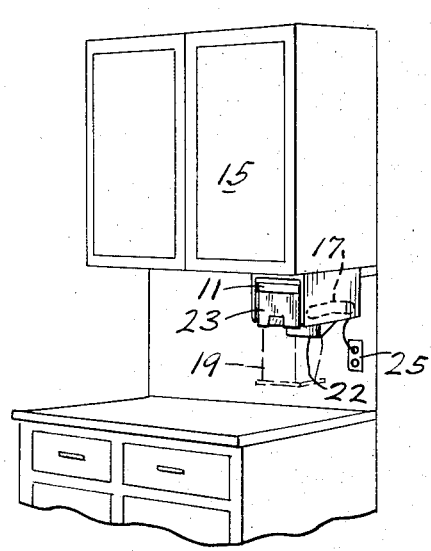
FIG-1-
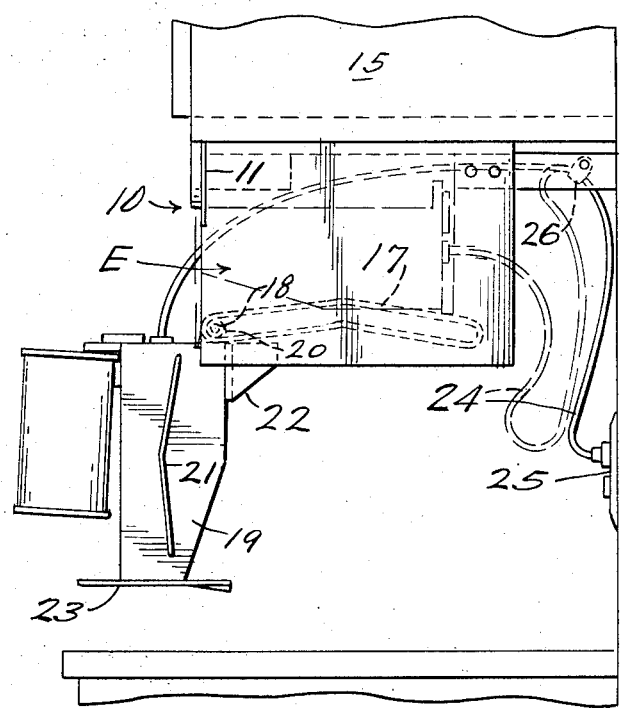
FIG-2-
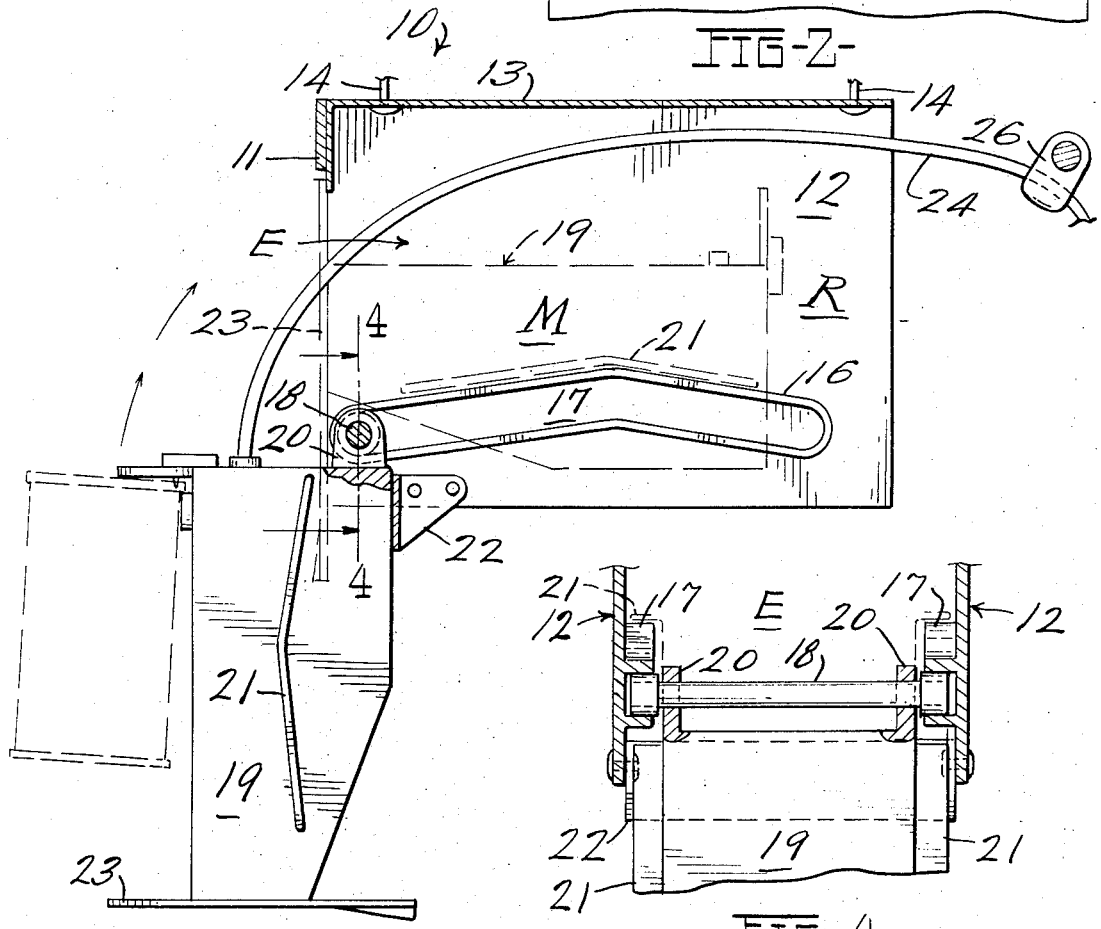
FIG-3-
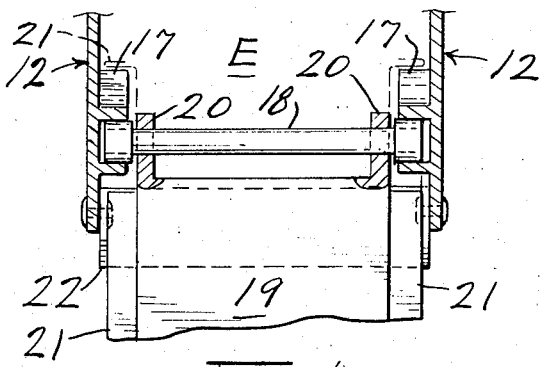
FIG-4-

APPLIANCE STORAGE APPARATUS

BACKGROUND OF THE INVENTION

Several types of electric appliances designed for kitchen use, such as electric can openers, ice crushers and the like, are designed to be placed directly on a kitchen counter top. An electric can opener, for example, placed on the counter takes up otherwise useable work space and makes cleaning of the counter area difficult. The present invention provides a storage apparatus adaptable for such appliances which permits storage in an enclosure suspended from either a kitchen cabinet or wall area. The appliance is hidden from view when not in use and yet readily movable to a secure operating position. In location above a kitchen counter top, the storage apparatus provides for ease of use of the appliance and simplifies cleaning of the counter area. Furthermore, valuable work space otherwise taken up by the appliance on the counter top is left free.

SUMMARY OF THE INVENTION

The invention comprises a storage apparatus for electric appliances. The apparatus, comprising a frame and opposing side walls defining an enclosure, is mounted on a wall or cabinet. Parallel, arched tracks are located adjacent to the inner sides of the opposing side walls. Each of the tracks defines a guide groove extending from the front to the rear of the enclosure. The center of the guide groove is peaked and higher than the opposing ends of the groove. A round projection connected to the appliance has opposite ends in registry with the opposing guide grooves. At the front of the enclosure, the appliance is pivotal from a vertical operating position to a horizontal storage position about the round projection. Movement of the round projection along the tracks carries the appliance in or out of the enclosure. A stop member on the appliance supports it in a secure vertical position for use. A flange also connected to the appliance slides into registry with the upper surface of the arched track frame when the appliance is moved, by the round projection, along the tracks to the rear of the enclosure, thus supporting the appliance within the enclosure. A door member connected to the end of the appliance adjacent the front of the enclosure when the appliance is in its stored position, closes the front of the enclosure concealing the appliance therein.

BRIEF DESCRIPTION OF THE DRAWINGS

FIG. 1 is a perspective view of the appliance closure apparatus of the present invention on a conventional kitchen cabinet;

FIG. 2 is a side view of the appliance closure apparatus with the appliance in a vertical operating position;

FIG. 3 is an elevational, partially diagrammatic view of the appliance storage apparatus of the present invention; and FIG. 4 is a cross-sectional view of the appliance storage apparatus taken along line 4—4 of FIG. 3.

DESCRIPTION OF THE PREFERRED EMBODIMENT

Referring to the drawings, an appliance storage apparatus 10 includes a frame 11, opposing side walls 12; and a top wall 13 is shown. Screws 14 secure the apparatus 10 to a cabinet 15.

Arched track frames 16 are connected in opposing relationship to the interior sides of the opposing side walls 12. The arched track frames 16 each define a groove 17 which extends from an open front F to a rear R portion of the enclosure defined by the opposing side walls 12. The arched track frames 16 are each peaked at their mid point M so that the front F and the rear R of the tracks are lower than the mid point M.

A round projection 18 is connected to an appliance 19 to be stored by means of flanges 20 attached to the appliance 19. The round projection 18 extends horizontally across the enclosure E to the arched track frames 16. The round projection 18 has its opposite ends in registry with the groove 17 within each arched track frame 16. The round projection is thus movable from the front F to the rear R of the enclosure E along the grooves 17.

A support member 21 is attached to the appliance 19 extending along the long axis of the appliance 19 as shown in FIGS. 2 and 3. The support member is arched for registry with the upper surface of the track frame when the appliance 19 is stored as will be described. Adjustable stop abutments 22 are connected to the opposing side walls 12 and hold the appliance 19 in a vertical position, as shown in FIGS. 2 and 3, to maintain the appliance 19 in the vertical position for use. A door element 23 is connected to the bottom end of the appliance 19, as shown in FIG. 2.

In operation, the appliance 19, in order to be stored, is pivoted about the round projection 18 to a horizontal position at the front F of the enclosure E, bringing a support member 21 above the upper side of at least one of the arched track frames 16. The appliance 19, connected to the round projection 18, is then pushed into the enclosure along the track groove 17 until the round projection 18 reached the rearmost end of the grooves 17. With the appliance 19 in the enclosure E the support member 22 is in registry with the upper surface of the track frame 16, maintaining the appliance 19 in an approximate horizontal position within the enclosure. The door member 23, ving been pivoted upwardly engages the front of the frame 11 to enclose the front F of the enclosure E as shown in the FIG. 1 solid line position. Thus in the stored position, the appliance 19 is completely hidden from view. When it is desired to use the appliance, it is only necessary to pull the appliance 19 forwardly moving the round projection 18 along the grooves 17 to the front F of the enclosure E. The appliance 19 is then pivoted to a vertical position. In the vertical position, the appliance 19 is ready for use.

An appliance electric cord 24 is plugged into a conventional wall socket 25 and is supported by a bracket 26 for unobstructed movement of the appliance 19 in and out of the enclosure E. Means are thereby provided for storage and support of the electric appliance for use above the counter surface.

The foregoing disclosure and description of this invention are illustrative and explanatory thereof, and various changes in size, shape, and materials as well as in details of the illustrated construction may be made without departing from the scope of the following claims.

What I claim is:

1. An appliance storage apparatus comprising an enclosure having opposing side walls, opposing closed arched tracks connected to said side walls, said tracks extending in generally horizontal direction and curving upwardly from opposite ends to a peak at the center of said tracks, a captive projection roller in registry with each of said tracks for pivotally carrying said appliance from a horizontal storage position within said enclosure to a vertical operating position outside of said enclosure, said projection roller providing a sole means of vertical support for said appliance when outside of said enclosure, and stop means on said enclosure for retaining the appliance against rearward pivotal movement when the appliance is in its operating position outside of said enclosure and support means on said appliance for retaining the appliance in its said storage position, said support means comprising at least one arched flange complementary with said arched tracks, said arched flange being in registry with said arched track when said appliance is in said horizontal storage position, whereby said appliance is held in a static captive relationship when in such storage position.

2. An appliance stoage apparatus according to claim 1 wherein said enclosure means comprises a frame and walls connected to said frame for receiving the appliance in said first approximate hprizontal stored position.

3. An appliance storage apparatus according to claim 1 wherein said projection means comprises a cylinderical projection attached to the appliance and having opposite ends in sliding registry with said track means.

4. An appliance storage apparatus according to claim 1 wherein said track means comprises a generally horizontal arched frame defining an arched guide groove along at least one of said side walls, the end points of said track lying at a point lower than the mid point of said arched track.

* * * * *

UNITED STATES PATENT OFFICE
CERTIFICATE OF CORRECTION

Patent No. 3,814,366              Dated June 4, 1974

Inventor(s) Earl Franklin Staifer

It is certified that error appears in the above-identified patent and that said Letters Patent are hereby corrected as shown below:

On the cover sheet [76] "Glenn" should read -- Glen --. Column 2, line 40, "22" should read -- 21 --. Claim 2, line 4, "hprisontal" should read -- horizontal --.

Signed and sealed this 1st day of October 1974.

(SEAL)
Attest:

McCOY M. GIBSON JR.            C. MARSHALL DANN
Attesting Officer                 Commissioner of Patents